United States Patent [19]

Pesikov

[11] Patent Number: 4,949,465

[45] Date of Patent: * Aug. 21, 1990

[54] COUNTERWEIGHT FOR COORDINATE MEASURING MACHINE

[75] Inventor: Vitaly I. Pesikov, Providence, R.I.

[73] Assignee: Brown & Sharpe Manufacturing Company, North Kingstown, R.I.

[ * ] Notice: The portion of the term of this patent subsequent to Jun. 6, 2006 has been disclaimed.

[21] Appl. No.: 360,009

[22] Filed: Jun. 1, 1989

Related U.S. Application Data

[63] Continuation of Ser. No. 925,323, Oct. 31, 1986, Pat. No. 4,835,871.

[51] Int. Cl.$^5$ .............................................. G01B 5/20
[52] U.S. Cl. ...................................... 33/1 M; 33/503
[58] Field of Search ................ 33/1 M, 503, 504, 505, 33/23.05

[56] References Cited

U.S. PATENT DOCUMENTS 4,389,781 6/1983 Donaldson ........................... 33/1 M
4,631,834 12/1986 Hayashi et al. ...................... 33/503
4,799,316 1/1989 Tuss ................................... 33/1 MX Primary Examiner—Harry N. Haroian
Attorney, Agent, or Firm—Wolf, Greenfield & Sacks

[57] ABSTRACT

Apparatus for counterbalancing a vertically movable element of a machine includes an air cylinder attached to the movable element on the axis of movement and having a small axial opening at its upper end. A piston located in the air cylinder is attached to a fixed machine element by a nonelastic, flexible member such as a thin, nylon-jacketed wire passing through the axial opening in the cylinder. Air under pressure sufficient to counterbalance the weight of the movable element is supplied to the space between the piston and the axial opening in the cylinder. The flexible member makes the counterbalancing assembly relatively insensitive to misalignment and vibration. Air is permitted to leak around the piston to reduce friction and to relieve pressure buildup during downward movement. In another embodiment, the air cylinder is attached to the fixed machine element.

22 Claims, 2 Drawing Sheets

COUNTERWEIGHT FOR COORDINATE MEASURING MACHINE

This application is a continuation of application Ser. No. 925,323, filed Oct. 31, 1986, now Pat. No. 4,835,871.

FIELD OF THE INVENTION

This invention relates to counterweights for machines and, more particularly, to a counterweight for a vertically movable element which minimizes friction and which is insensitive to misalignment.

BACKGROUND OF THE INVENTION

Counterweights are commonly used in coordinate measuring machines and in a variety of machine tools to balance the weight of vertically movable machine elements. In a coordinate measuring machine a probe is attached to a vertically movable Z-rail which is also movable in a horizontal plane. Thus, the probe can be moved in three dimensions for contact with a workpiece which is being measured. The counterweights oppose the weight of the probe and the Z-rail so that they essentially float in the vertical or Z direction The counterweight permits relatively fast vertical movement and reduces the required force for vertical drive.

Among the requirements of the counterweight are that friction be minimized as the movable element travels upward and downward. In addition, the counterweight must be relatively insensitive to misalignment. When the counterweight is slightly misaligned with the axis of movement, frictional forces should remain low.

A variety of counterweights are known in the prior art. A weight connected by a chain and a pulley to a movable element is disclosed in U.S. Pat. No. 1,782,573, Johnson. U.S. Pat. No. 3,671,133, Galbarini et al, discloses the use of a hydraulic piston connected by a piston rod and a system of flexible cables and pulleys to a machine tool. U.S. Pat. No. 3,580,133, Berthiex, discloses a counterweight system including a hydraulic balance compensating device and a system of cables and pulleys. U.S. Pat. No. 2,571,049, Meylich, discloses a pneumatic counterweight for a milling machine including an air cylinder, connecting rods and an air regulation system. In these systems friction is introduced by the pulley systems, and in hydraulic systems utilizing piston rods, misalignment of the cylinder with the axis of movement can cause increased friction and binding.

It is a general object of the present invention to provide an improved counterweight system for a machine.

It is another object of the present invention to provide a counterweight for a machine which is relatively insensitive to misalignment and which permits rapid movement.

It is a further object of the present invention to provide a counterweight system which is relatively free of frictional forces during movement of the element to which the counterweight is attached.

It is another object of the present invention to provide a counterweight system for a machine wherein the weight of the movable element is accurately balanced.

It is yet another object of the present invention to provide a counterweight system which is isolated from machine vibrations.

SUMMARY OF THE INVENTION

According to the present invention, these and other objects and advantages are achieved in apparatus for counterbalancing a vertically movable element of a machine. The apparatus comprises a cylinder defining an elongated cylindrical space, mounted in the movable element, with its axis parallel to the direction of movement of the movable element and having a small axial opening at its upper end. The apparatus further includes a piston located in the cylindrical space for axial movement therein, a machine element fixed in the vertical direction and having a portion aligned with the axis of the cylinder, and a nonelastic, flexible member attached between the piston and the fixed machine element and passing through the opening in the cylinder. The apparatus also includes means for supplying air under pressure to the portion of the cylindrical space between the piston and the opening in the cylinder sufficient to counterbalance the weight of the movable element.

Preferably, the flexible member is a thin wire cable which can be solid or include multiple strands. The opening in the cylinder is defined by a low friction jewel. The flexible member and the opening in the cylinder are dimensioned to provide a relatively tight fit without creating substantial friction during movement. Due to the lateral flexibility of the wire, the cylinder can be slightly misaligned from the axis of movement without causing appreciable friction.

According to another aspect of the invention, the piston and the inside of the cylindrical space are dimensioned to permit sufficient leakage of the air under pressure to minimize friction and to partially relieve pressure buildup during movement of the movable element.

According to another aspect of the present invention, the air supply means includes pressure regulator means for balancing the force exert ed by the air under pressure and the weight of the movable element. The air supply means further includes a pressure relief valve to relieve pressure buildup in the cylindrical space during movement of the movable element.

According to another embodiment of the invention, the counterbalancing apparatus includes an air cylinder having a small opening at its lower end attached to a fixed element of the machine. A nonelastic, flexible member is attached between a piston in the cylinder and a vertically movable element of the machine, and air under pressure is supplied to the air cylinder so as to counterbalance the weight of the movable element.

BRIEF DESCRIPTION OF THE DRAWINGS

For a better understanding of the present invention, together with other and further objects, advantages and capabilities thereof, reference may be had to the accompanying drawings which are incorporated herein by reference and in which.

DETAILED DESCRIPTION OF THE INVENTION

Figure 1:
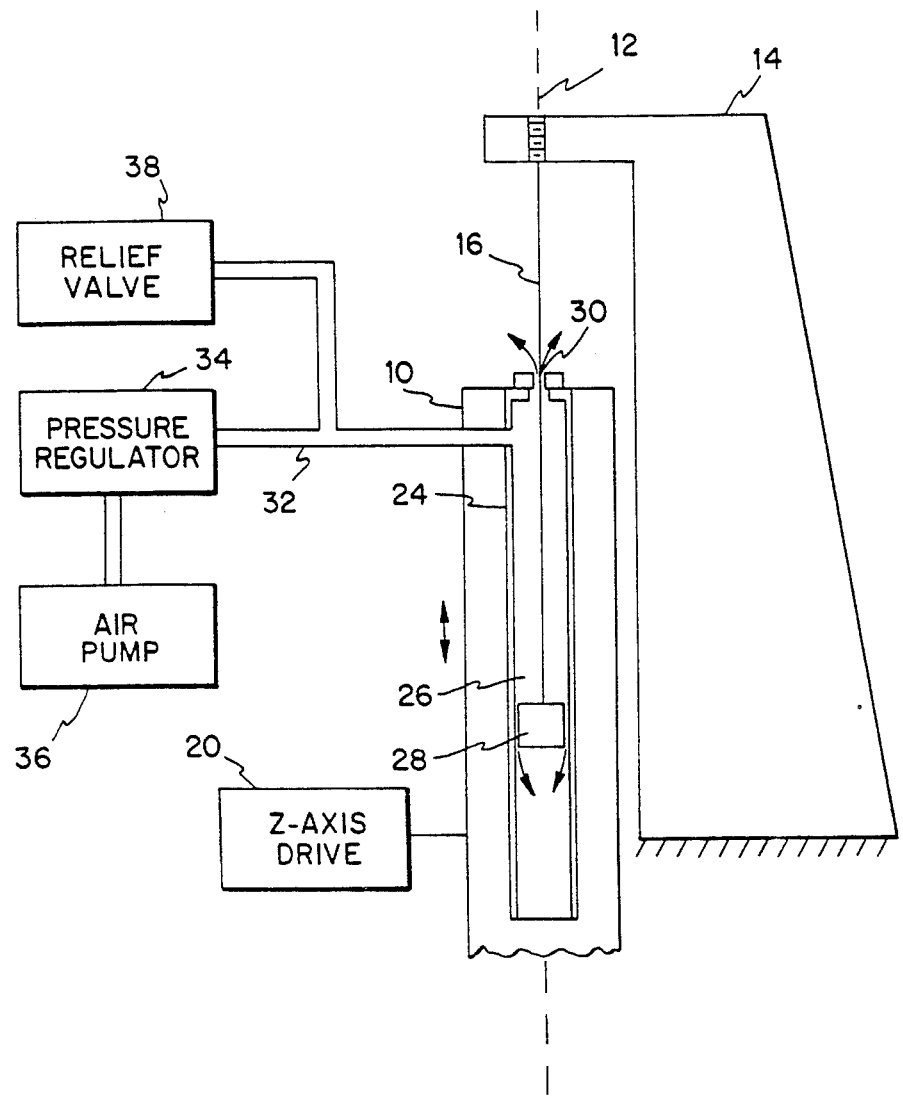
FIG. 1 is a schematic diagram illustrating the counterweight assembly of the present invention.

A portion of a system utilizing the present invention is shown in schematic form in FIG. 1. An element 10 is vertically movable along a Z-axis 12. The present invention is illustrated with reference to a coordinate measuring machine wherein the movable element 10 is commonly called a Z-rail. It will be understood that the invention is generally applicable in machines having a vertically movable element. A machine element 14 is fixed with respect to Z-axis 12 and includes a portion on the Z-axis 12. The Z-rail 10 is suspended from the machine element 14 by a nonelastic, flexible element 16 as described in detail hereinafter. Z-rail 10 is caused to move along the Z-axis 12 by a Z-axis drive 20 which can be manual or motor-driven. Any suitable type of Z-axis drive 20 can be utilized.

In a coordinate measuring machine, the assembly comprising Z-rail 10, machine element 14 and Z-axis drive 20 are movable in a horizontal X, Y plane. Typically, the lower end of the Z-rail is provided with a probe (not shown) for contacting the workpiece. The X, Y, Z coordinates of the contact point on the workpiece are determined by the coordinate measuring machine. The coordinate measuring machine is used to obtain coordinates of a large number of points on the workpiece. For efficient operation, it is desirable to move quickly and accurately between measuring points. The counterweight system of the present invention assists in achieving such rapid and accurate movement.

In accordance with the present invention, an air cylinder 24 is mounted on the Z-rail 10 with its axis aligned with the vertical direction of movement. Preferably, the axis of the cylinder 24 coincides with the Z-axis 12 of the Z-rail 10. The air cylinder 24 defines a cylindrical space 26 in which is located a piston 28. The piston 28 is slightly smaller in dimension than the inside wall of the air cylinder 24, such that the piston 28 is movable axially in the cylindrical space 26. The upper end of piston 28 is connected to one end of the nonelastic, flexible element 16. The flexible element 16 passes through a small axial opening 30 in air cylinder 24 and is connected at its other end to the machine element 14 on the Z-axis 12. In one preferred embodiment, the piston 28 is graphite for light weight and relatively low friction, and the inner walls of cylinder 24 are glass to minimize friction.

The portion of the cylindrical space 26 between the piston 28 and the axial opening 30 is connected by a conduit 32 to a pressure regulator 34. An air pump 36 is connected to the pressure regulator 34 and supplies air under pressure thereto. The space 26 above the piston 28 is also connected to a pressure relief valve 38 which, in practice, may be part of the pressure regulator. The pressure regulator 34, the air pump 36 and the relief valve 38 are of conventional design.

The flexible element 16 is characterized by being nonelastic along the Z-axis 12 and being flexible in any direction lateral to the Z-axis 12. This permits misalignment of the Z-rail 10 and the machine element 14 in the horizontal plane without causing binding or substantial friction as the flexible element 16 passes through the opening 30. In a preferred embodiment, the flexible element is a stranded wire for strength. If desired, the wire can have a jacket such as nylon. The diameter is kept small to reduce the volume of air leakage at the opening 30. It will be understood that the element 16 can be any nonelastic, flexible element such as solid or stranded wire with or without an outer jacket, a string or cord, or a polymer strand. The criteria are that the element 16 have sufficient strength to support the Z-rail 10 with a safety factor, have a relatively small diameter, have a relatively smooth outer surface to minimize friction, and have flexibility lateral to the Z-axis 12.

It is preferred that the axial opening 30 at the upper end of air cylinder 24 be provided with a jewel to accurately define the size of the opening, to minimize wear and to minimize friction between the walls of the opening and the flexible element 16. In a preferred embodiment, the opening 30 is defined by a sapphire jewel mounted in brass. The diameter of the flexible element 16 should be matched as closely as possible to the inside diameter of the opening 30 to minimize air leakage. In addition, both dimensions should be small to minimize the volume of air leakage. However, the flexible element 16 should not fit the opening 30 so tightly as to cause appreciable friction during movement.

In another feature of the invention, the piston 28 is dimensioned slightly smaller than the inside wall of air cylinder 24 to permit leakage in the annular space around the piston 28. The flow of air around the piston 28 minimizes friction with the walls of the cylinder 24. In addition, pressure buildup in the cylindrical space 26 as the Z-rail 10 moves downward is relieved in part by the leakage.

In operation, air under pressure is supplied from air pump 36 through pressure regulator 34 to the cylindrical space 26 above the piston 28. The pressurized air exerts a downward force on the piston 28 which is transmitted through flexible element 16 to machine element 14. The pressurized air exerts an equal and opposite upward force on the upper end of cylinder 24, thereby tending to lift Z-rail 10. The air pressure is selected to exert an upward force equal to the air pressure times the area of the top end of cylinder 24 which is equal to the weight of Z-rail 10 and any additional elements connected to it. When the upward force on the top of cylinder 24 is thus balanced against the weight of the Z-rail 10, the Z-rail 10 essentially floats in a fixed position.

When the Z-rail 10 is to be moved upward along Z-axis 12, an upward force is applied by Z-axis drive 20. The upward movement causes an expansion of the volume of cylindrical space 26 and a reduction in the air pressure therein. During upward movement the air pump 36 and pressure regulator 34 supply increased amounts of air to the cylindrical space 26 so as to maintain the required counterbalancing pressure. The air pump 36 and pressure regulator 34 have sufficient capacity to maintain the desired pressure in cylindrical space 26 during upward movement at the maximum expected rate.

During downward movement of the Z-rail 10, the volume of the cylindrical space 26 is reduced and air pressure therein increases. The increased pressure is relieved in part by leakage between the flexible element 16 and the opening 30 and in part by leakage around the sides of piston 28. In addition, the pressure relief valve 38 relieves pressure buildup when the pressure exceeds the set value. When the set pressure value is exceeded, the relief valve 38 opens and momentarily vents the cylindrical space 26 to atmosphere, thereby causing a pressure reduction.

The counterbalancing apparatus of the present invention permits the Z-rail 10 and the machine element 14 to be slightly misaligned without causing excessive frictional forces. In addition, the Z-rail 10 is substantially isolated against vibration in the remainder of the system since only upward vertical forces are transmitted by the flexible element 16 to the Z-rail 10. Although the cylinder 24 is typically circular in cross-section it can have any desired cross-sectional shape.

The Z-axis drive 20 can optionally be omitted from the system when manual Z-axis movement of the Z-rail 10 is desired. For non-manual operation, the Z-axis drive 20 can be a motor drive or a computer-controlled motor drive. The coupling between the motor and the Z-rail 10 can include a capstan drive, a helix angle roller system, or a rack-and-pinion system. However, any suitable Z-axis drive can be utilized.

Figure 2:
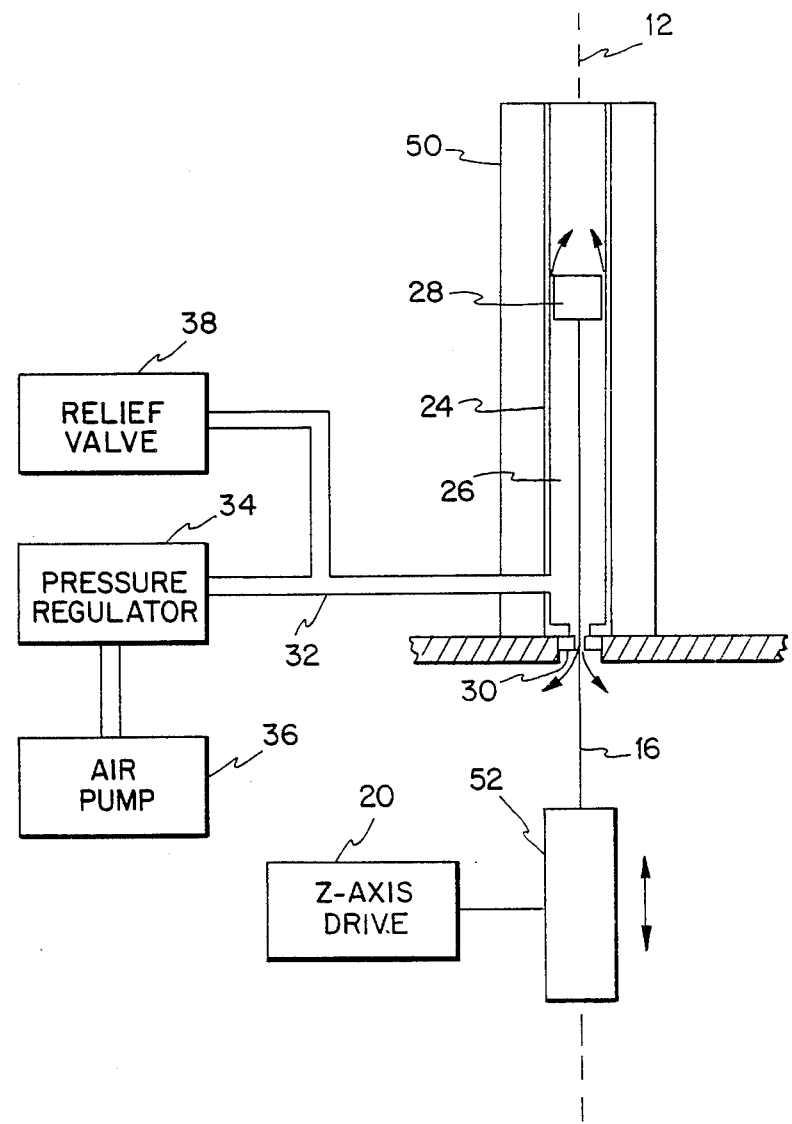
FIG. 2 is a schematic diagram illustrating another embodiment of the counterweight assembly of the present invention.

Another embodiment of the present invention, wherein the air cylinder 24 and piston 28 are mounted in a machine element 50 that is fixed on the Z-axis 12, is shown in schematic form in FIG. 2. A vertically movable element or Z-rail 52 is suspended from nonelastic, flexible member 16, and is caused to move along the Z-axis 12 by a Z-axis drive 20. As described above in connection with FIG. 1, the assembly comprising machine element 50, Z-rail 52 and flexible element 16 can be movable in a horizontal plane.

Air cylinder 24 defines a cylindrical space 26 and includes a small axial opening 30 at its lower end. The cylindrical space 26 is connected through a conduit 32 to a pressure regulator 34. Air under pressure is supplied to the pressure regulator from an air pump 36. A relief valve 38 is also connected to the cylindrical space 26.

The embodiment of FIG. 2 operates in the same manner as described hereinabove in connection with FIG. 1, except that the air cylinder 24 and piston 28 are inverted and attached to the fixed machine element. Air under pressure is supplied by air pump 36 and pressure regulator 34 to cylindrical space 26. The pressurized air causes an upward force to be exerted on the piston 28. The force is transmitted by flexible element 16 to the Z-rail 52. When the upward force on the piston 28 equals the weight of Z-rail 52, then Z-rail 52 is effectively counterbalanced. The advantages of the flexible element 16 described above in connection with FIG. 1, are present in the embodiment of FIG. 2.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for counterbalancing a vertically movable element of a machine comprising:
    a cylinder defining an elongated cylindrical space attached to the movable element with its axis parallel to the direction of movement of said movable element and having a small axial opening at its upper end;
    a piston located in said cylindrical space for axial movement therein;
    a machine element fixed in the vertical direction and having a portion aligned with the axis of said cylinder;
    an elongated connection member attached between said piston and said fixed machine element and passing through said opening in said cylinder, said connection member being substantially nonelastic in a longitudinal direction and being substantially free to bend and flex in a direction transverse of the axis of said cylinder for permitting misalignment of said movable element with respect to said fixed machine element in a horizontal plane without binding of said connection member at said opening and without causing substantial friction between said connection member and said opening;
    means for supplying air under pressure to the portion of said cylindrical space between said piston and said opening in said cylinder sufficient to counterbalance the weight of said movable element.

2. Apparatus as defined in claim 1 wherein said piston and the inside of said cylinder are dimensioned to permit sufficient leakage of said air under pressure to minimize friction and to relieve pressure buildup during movement of the movable element.

3. Apparatus as defined in claim 1 wherein said connection member and said opening in said cylinder are dimensioned to minimize air leakage without causing appreciable friction during movement.

4. Apparatus as defined in claim 1 wherein said air supply means includes pressure regulator means for balancing the force exerted by said air under pressure and the weight of said movable element.

5. Apparatus as defined in claim 4 wherein said air supply means further includes a pressure relief valve to relieve excess pressure in said cylindrical space during movement of said movable element.

6. Apparatus as defined in claim 1 wherein the axis of said cylindrical space coincides with the axis of movement of said movable element.

7. Apparatus as defined in claim 1 wherein said connection element comprises a relatively thin wire and said opening in said cylinder is defined by a low friction jewel.

8. Apparatus as defined in claim 1 including a glass cylinder and a graphite piston for minimizing friction therebetween.

9. Apparatus as defined in claim 1 further including drive means for causing vertical movement of said movable element.

10. Apparatus as defined in claim 1 wherein said machine is a coordinate measuring machine and said apparatus is movable in a horizontal plane.

11. Apparatus for counterbalancing a vertically movable element of a machine comprising:
    a machine element fixed in the vertical direction;
    a cylinder defining an elongated cylindrical space attached to the fixed machine element with its axis parallel to the direction of movement of said movable element and having a small axial opening at its lower end;
    a piston located in said cylindrical space for axial movement therein;
    an elongated connection member attached between said piston and said movable element and passing through said opening in said cylinder, said connection member being substantially nonelastic in a longitudinal direction and being substantially free to bend and flex in a direction transverse of the axis of said cylinder for permitting misalignment of said movable element with respect to said fixed machine element in a horizontal plane without binding of said connection member at said opening in said cylinder and without substantial friction between said connection member and said opening in said cylinder;
    means for supplying air under pressure to the portion of said cylindrical space between said piston and said opening in said cylinder sufficient to counterbalance the weight of said movable element.

12. Apparatus as defined in claim 11 wherein said piston and the inside of said cylinder are dimensioned to permit sufficient leakage of said air under pressure to minimize friction and to relieve pressure buildup during movement of the movable element.

13. Apparatus as defined in claim 11 wherein said connection member and said opening in said cylinder are dimensioned to minimize air leakage without causing appreciable friction during movement.

14. Apparatus as defined in claim 11 wherein said air supply means includes pressure regulator means for balancing the force exerted by said air under pressure and the weight of said movable element.

15. Apparatus as defined in claim 14 wherein said air supply means further includes a pressure relief valve to relieve excess pressure in said cylindrical space during movement of said movable element.

16. Apparatus as defined in claim 11 wherein the axis of said cylindrical space coincides with the axis of movement of said movable element.

17. Apparatus as defined in claim 11 wherein said connection element comprises a relatively thin wire and said opening in said cylinder is defined by a low friction jewel.

18. Apparatus as defined in claim 11 including a glass cylinder and a graphite piston for minimizing friction therebetween.

19. Apparatus as defined in claim 11 further including drive means for causing vertical movement of said movable element.

20. Apparatus as defined in claim 11 wherein said machine is a coordinate measuring machine and said apparatus is movable in a horizontal plane.

21. Apparatus for counterbalancing a vertically movable element of a machine comprising:
   a cylinder defining an elongated cylindrical space attached to the movable element with its axis parallel to the direction of movement of said movable element and having a small axial opening at its upper end;
   a piston located in said cylindrical space for axial movement therein;
   a machine element fixed in the vertical direction and having a portion aligned with the axis of said cylinder;
   connection means passing through said opening in said cylinder for connecting said piston and said fixed machine element, said connection means being substantially nonelastic in a longitudinal direction and being substantially free to bend and flex in a direction transverse of the axis of said cylinder for substantially eliminating friction and wear at said opening caused by misalignment of said movable element with respect to said fixed machine element in a horizontal plane;
   means for supplying air under pressure to the portion of said cylindrical space between said piston and said opening in said cylinder sufficient to counterbalance the weight of said movable element.

22. Apparatus as defined in claim 21 wherein said connection means is selected from a group consisting of a solid wire, a stranded wire, a string, a cord and a polymer strand, members of the group being characterized as having a diameter which is small relative to said cylinder and having a relatively smooth outer surface, and wherein said opening of said cylinder is defined by a low friction jewel.

* * * * *